United States Patent [19]

Boer

[11] Patent Number: 5,987,981
[45] Date of Patent: Nov. 23, 1999

[54] METHOD FOR MOMENTARILY IDENTIFYING A GAS OR LIQUID FLOW, AND DEVICE FOR CARRY OUT THE METHOD

[75] Inventor: Hendrik Jan Boer, Lochem, Netherlands

[73] Assignee: Berkin B.V., Ruurlo, Netherlands

[21] Appl. No.: 08/921,913

[22] Filed: Sep. 2, 1997

[30] Foreign Application Priority Data

Jun. 9, 1996 [NL] Netherlands ............................ 1003973

[51] Int. Cl.$^6$ ........................................................ G01F 1/68
[52] U.S. Cl. ........................................................ 73/202.5
[58] Field of Search .............................. 73/861.41, 200, 73/204.26, 202, 204.21, 202.5

[56] References Cited

U.S. PATENT DOCUMENTS

| | | | |
|---|---|---|---|
| 3,425,277 | 2/1969 | Adams | 73/202 |
| 3,559,482 | 2/1971 | Baker et al. | 73/202 |
| 4,100,801 | 7/1978 | LeMAy | 73/202 |
| 4,433,545 | 2/1984 | Rutherford | 73/202 |
| 4,790,194 | 12/1988 | Bellows et al. | |
| 5,036,701 | 8/1991 | Van Der Graaf | 73/204.12 |
| 5,295,394 | 3/1994 | Suzuki | 73/202 |
| 5,388,604 | 2/1995 | Clem | |
| 5,511,416 | 4/1996 | Shambayati | |

FOREIGN PATENT DOCUMENTS

| | | |
|---|---|---|
| 0395126 | 10/1990 | European Pat. Off. . |
| 0572108 | 12/1993 | European Pat. Off. . |
| 2723809 | 12/1977 | Germany . |
| 1319160 | 6/1973 | United Kingdom . |
| 2026704 | 2/1980 | United Kingdom . |

*Primary Examiner*—Richard Chilcot
*Assistant Examiner*—Jewel V. Thompson
*Attorney, Agent, or Firm*—Ostrolenk, Faber, Gerb & Soffen, LLP

[57] ABSTRACT

Method for momentarily identifying the composition of a gas or fluid flow, and device for carrying out the method.

The flow is conducted through an orifice in a conduit. Parallel to—and passing over—the orifice, there is a capillary conduit having a mass-flow meter therein. There is measured a combination of physical properties. By comparing said combination with values from a table, each of which is associated with a specific gas composition, the current composition may be determined.

9 Claims, 1 Drawing Sheet

METHOD FOR MOMENTARILY IDENTIFYING A GAS OR LIQUID FLOW, AND DEVICE FOR CARRY OUT THE METHOD

BACKGROUND OF THE INVENTION

The invention relates to a method for momentarily identifying a gas or a fluid, or a composition thereof, with the help of a sensing device such as mass-flow sensor.

Here, 'the composition' is understood to refer to quality, but especially to quantity; in which concentration a specific component is present in a gas (mixture), statically, but also dynamically 'in the time'. Concentrations may change, e.g., by altering additions of the substance in question. Thus, data are obtained on the course of the composition in question; the extent to which it changes: to wit: 'on line'. Such data are of importance for various processes; e.g., in the semiconductor industry where, for certain processes, such as Chemical Vapour Deposition—CVD—, it is necessary to keep the concentration of the reaction-gas, which causes films of a material to precipitate onto a substrate, as constant as possible.

On-line measurements (i.e., measurements during the process) of the said type are not carried out as yet; data on, e.g., the concentration, are 'calculated back' from the result and then fed back to the device by which said concentrations are controlled, such as in a CVD process where the 'bubbler', by means of which a reaction-gas is fed to a carrier-gas.

SUMMARY OF THE INVENTION

It is possible, however, to carry out on-line measurements of the said type with the help of the method according to the invention. For this purpose, said method is characterised in that, during the flowing of the gas or the fluid, combinations of physical properties of the fluid are continuously determined, which are characteristic of the composition thereof. This method includes conducting the flow through a conduit having an orifice, i.e., a small hole, the size of which is adjustable, and by conducting a branch of said flow through a capillary conduit mounted such that it passes over the orifice, parallel thereto. This conduit is provided with a thermal mass-flow meter, with which the mass flow can be measured from the shift of the temperature profile of the flow through the capillary tube, and the said combinations of physical properties are determined, which are then compared with tables of the combinations in question drawn up earlier for fluids of the type in question.

The said physical properties are: the density $\rho$, the viscosity $\mu$ and the heat capacity $C_p$. Examples of fluids as referred to here are mixtures of carrier-gases $H_2$ and $N_2$ with additions of evaporated substances, such as TEOS (triethyl orthosilicate), $SiCl_4$, $TiCl_4$ and $H_2O$, but also pure substances.

Along an orifice, there takes place a pressure drop $\Delta p$, of which the size depends on the density $\rho$ of the fluid in question and of the volume flow $\phi_{v_o}$ through the orifice. When the pressure drop $\Delta p$ is now determined and the volume flow $\phi_{v_o}$ is known, the density $\rho$ may therefore be determined:

$$\Delta p = C_o . \rho . \phi^2_{v_o} \quad \text{(Equation No.1)},$$

where $C_o$ is a constant depending on the dimensions of the orifice.

And said pressure drop $\Delta p$ is measured using a measuring capillary: the flow $\phi_{v_c}$ through the capillary is laminar, which means that said flow is proportional to the $\Delta p$.

There applies:

$$\Delta p = C_c . \mu . \phi_{v_c} \quad \text{(Equation No.2)},$$

where:
$C_c$=a constant depending on the dimensions of the capillary;
$\mu$=the viscosity of the fluid;
$\phi_{v_c}$=the volume flow through the capillary.

Since the orifice and the capillary are mounted in parallel to one another, there applies:

$$\Delta p \text{ capillary} = \Delta p \text{ orifice} \quad \text{(Equation No.3)},$$

which means that $\phi_{v_c}$ proportional to $\phi^2_{v_o}$. Furthermore, the dimensions of the capillary and the orifice are chosen in such a manner that $\phi_{v_c}$ is much less than $\phi_{v_c}$. The total flow through this system then approximately equals $\phi_{v_c}$.

The $\phi_{v_c}$ is measured using a so-called thermal sensor on the capillary, such as it is disclosed, e.g., in U.S. Pat. No. 5,036,701. The shift measured—$\Delta T$—of the temperature profile, as in the event of a fluid flow this is realised by using a heating coil around the capillary, for such a sensor is a measure of the occurring mass flow. There applies:

$$\Delta T = C' . \rho . C_p . \phi_{v_c} \quad \text{(Equation No. 4)},$$

where:
$C'$=a constant;
$\rho$=the density of the fluid;
$C_p$=the heat capacity of the fluid;
$\phi_{v_c}$=the volume flow through the capillary already referred to.

From the equations (1), (2), (3) and (4), there follows the equation $$\Delta T = C'' . \rho^2 . C_p . \phi^2_{v_{total}} 1/\mu,$$

where:
$C''$=a constant;
$\rho$=the density of the fluid;
$C_p$=the heat capacity of the fluid;
$\phi_{v_{total}}$=the volume flow of the fluid through the orifice;
$\mu$=the viscosity of the fluid.

By measuring $\Delta T$ at a known total flow and under the condition that $\phi_{v_c}$ is much less than $\phi_{v_c}$, the term $\rho^2 C_p/\mu$ may therefore be determined.

When the values of $\rho^2 C_p/\mu$ are compared with values, also of $\rho^2 C_p/\mu$ of a fluid, classified in a table, consisting of combinations of the same component(s), they provide data on the concentrations of the component(s) in the fluid. The measured values provide the fingerprints of the fluid, as it were.

In most cases, the composition of a fluid as referred to here is achieved by adding a component to the fluid using a device appropriate for that purpose. In accordance with an embodiment of the method according to the invention, said composition is then kept constant, or it is adjusted to a specific, time-dependent pattern, by way of a feedback of the signals, obtained from the thermal mass-flow meter, to the feeding device.

Feeding a reaction gas to a carrier-gas then takes place, e.g., in a so-called 'bubbler'. A mixture which is used, e.g., in a CVD process, contains $H_2$ as a carrier-gas and $(CH_3)_3In$ (trimethyl indium, abbreviated TMI) as a reaction gas, added to the carrier-gas in a bubbler, by evaporating the solid substance. As a carrier-gas, a gas other than $H_2$ may be chosen and, as a reaction gas, a gas or vapour of a substance other than TMI.

The invention also comprises a device for carrying out the method according to the invention.

The present device is characterised in that it comprises a conduit part through which the fluid flows, and that in said conduit there is located an 'orifice' (a kind of diaphragm) through which the fluid flow is conducted and along which the pressure drop is measured using a shunt conduit passing over the orifice, which shunt conduit is a capillary provided with a thermal flow sensor as described in the U.S. Pat. No. 5,036,701.

The device is further explained by reference to the drawing which schematically shows the device.

BRIEF DESCRIPTION OF THE DRAWINGS

The FIGURE shown is a schematic diagram showing the new invention.

DETAILED DESCRIPTION OF THE PREFERRED EMBODIMENTS

Figure 1:
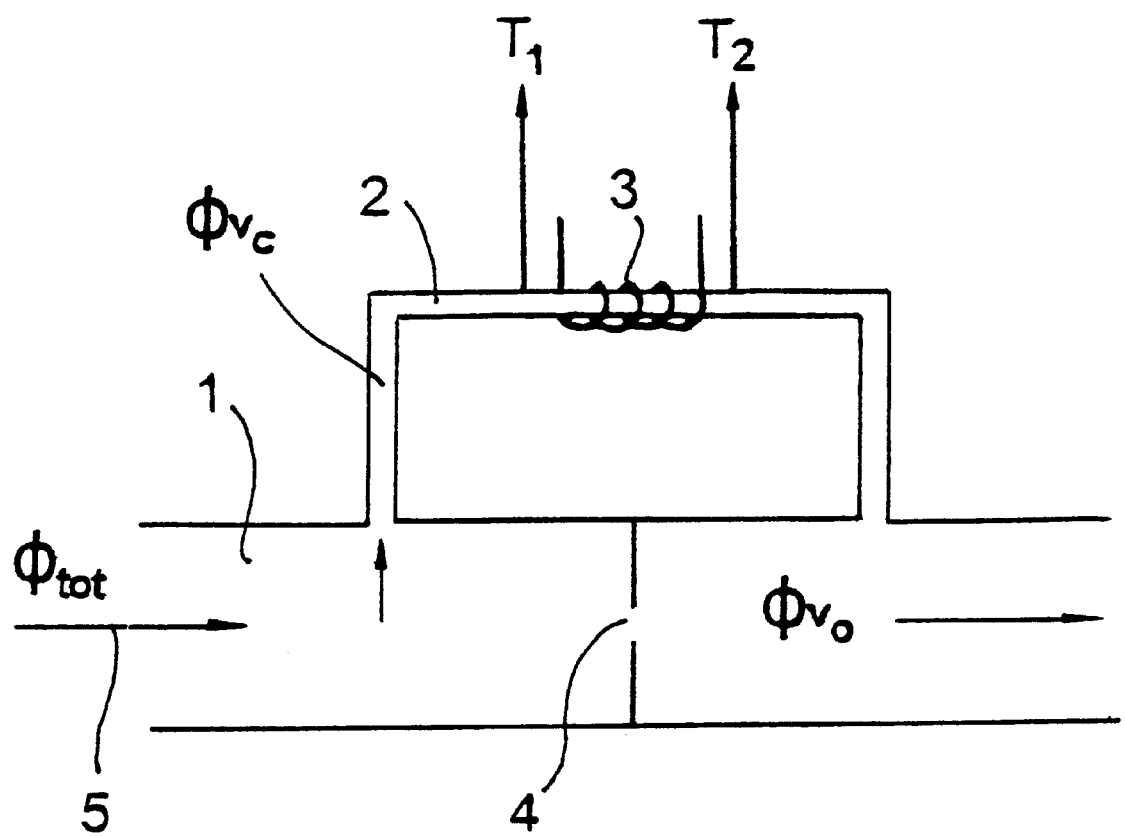

Through the conduit 1, the fluid having the volume flow $\phi_{V_{tot}}$ flows in the direction indicated by the arrow 5. In the conduit 1, there is located the orifice 4 through which the volume flow $\phi_{V_o}$ flows in the direction indicated. The pressure drop $\Delta p$ over said orifice 4 is measured using a 'shunt'—a capillary 2—through which flows the volume flow $\phi_{V_c}$ branched off from $\phi_{V_{tot}}$ provided with a thermal mass-flow meter which consists of a heat source 3, on either side of which the temperature of the fluid flowing through the capillary is measured: $T_1$ and $T_2$, respectively. As explained above, the change of the measured temperature profile $(T_2-T_1)$ is a measure of the pressure drop $\Delta p$ over the orifice 4.

The signal generated by the sensor may be fed back to the device controlling the addition of one or more components—e.g., a bubbler in which a carrier-gas is mixed with a (reaction) gas added thereto.

A change in the density of the fluid may be measured directly by implementing the device according to the invention in duplicate, under the condition that $C_p, \mu$ and the total flow do not change. In this case, there then flows a clean (carrier) gas through the first device, and that same (carrier) gas flows through the second device, with one or more components added thereunto.

The resistances of the sensors (the flow meters) of the two devices are then placed in a Wheatstone-bridge. The output signal then is a direct measure of the change in density.

I claim:

1. A method for continuously identifying a gas or a fluid or a composition thereof, the method including use of a database comprising data of the combinations of physical properties which are characteristic of known fluids or gases or compositions thereof, the method comprising the steps:

conducting a flow of said gas or fluid or composition thereof to be identified through a first conduit having a flow-restricting orifice whose size is adjustable but fixed to a known size during the application of this method, conducting a branch of said flow through a capillary shunt conduit having entrance and exit openings situated upstream and downstream of said orifice respectively, said capillary shunt conduit being provided with a sensing device which determines the shift of the temperature profile of said flow through said capillary tube, determining said combination of physical properties of said flow through said capillary shunt conduit, and comparing said determined combination of physical properties with said combinations of physical properties in said database, thereby identifying the gas or fluid or composition thereof flowing in said capillary shunt, and thus the identity of said flow through said first conduit.

2. A method according to claim 1 for keeping constant a desired composition of the flow through said first conduit, wherein there is a source of said flow through said first conduit and first means for adjusting the composition of the flow from said source to said first conduit, and wherein said determined combination of physical properties data are fed back to said first means which responsive to said data adjusts said flow to keep constant a desired composition thereof.

3. The method according to claim 1, wherein the flow comprises a carrier-gas, and a reaction gas is added in by a bubbler, which receives signals obtained from said sensing device.

4. The method according to claim 3, wherein the carrier-gas is hydrogen gas and the reaction gas is trimethyl indium $((CH_3)_3In)$.

5. A device for identifying a gas or a composition thereof, said device operable with a database comprising data of combinations of physical properties which are characteristic of known fluids or gases or compositions thereof, said device comprising:

a first conduit through which the gas or fluid or composition thereof to be identified flows, a flow-restricting of original in said first conduit, said orifice having size which is variable but fixed during application of this device, said first conduit having a branch into which flows a portion of said flow, a capillary shunt conduit which receives said portion of said flow, said capillary shunt conduit including a sensing device which determines the shift of the temperature profile of the flow through said capillary shunt conduit, which provides data to determine said combination of physical properties of said flow, whereby said determined combination of physical properties are compared with said combinations of physical properties in said database, to thereby determine the identity of said flow through said capillary shunt conduit and thus the identity of said flow through said first conduit.

6. The method of claim 5, further comprising a step of varying the size of the orifice.

7. A method for continuously identifying a gas or a fluid or a composition thereof, the method including use of a database comprising data of the combinations of physical properties which are characteristic of known fluids or gases or compositions thereof, the method comprising the steps of:

conducting a flow of the gas or fluid or composition thereof through a conduit having a diaphragm with an orifice whose size is adjustable but fixed to a known size during the application of this method;

conducting a branch of said flow through a capillary conduit having entrance and exit openings mounted such that the entrance opening is upstream of the orifice and the exit opening is downstream of the orifice, the conduit being provided with a sensing device which measures the shift of the temperature profile of the flow through the capillary tube;

determining said combination of physical properties of the flow using information from said sensing device; and comparing said combination of physical properties with said combinations of physical properties in said database, thus identifying the gas or fluid or composition thereof.

8. The method according to claim 7, wherein the thermal mass-flow meter sends a signal to a device which determines the composition of the flow by adjusting the composition of the flow.

9. A device for identifying a gas or a fluid or a composition thereof comprising:

a conduit part through which the gas or fluid or composition thereof flows;

a diaphragm having an orifice in the conduit, the size of the orifice being variable but fixed to a known size during application of this device;

a capillary conduit provided with a sensing device and having an entrance upstream of the diaphragm and an exit downstream of the diaphragm; and a table for identifying a gas or fluid based on the combination of physical properties derived from the thermal sensing device.

* * * * *